No. 653,691. Patented July 17, 1900.
O. A. NORLUND.
NUT LOCK.
(Application filed Mar. 1, 1900.)
(No Model.)
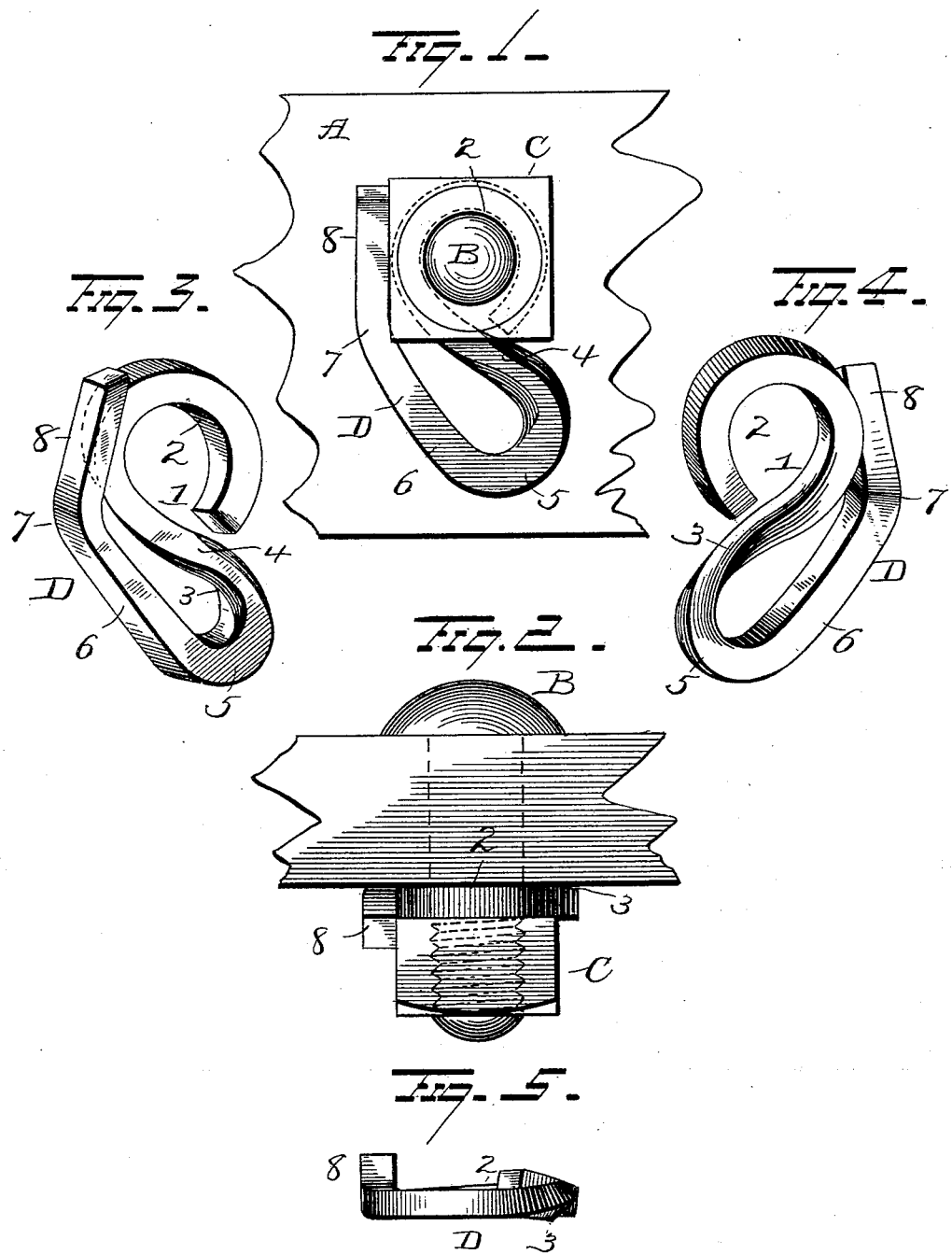
WITNESSES
INVENTOR
O. A. Norlund
By H. A. Seymour
Attorney

UNITED STATES PATENT OFFICE.

OLOF A. NORLUND, OF CEDAR RUN, PENNSYLVANIA, ASSIGNOR OF ONE-HALF TO GEORGE A. GAMBLE, OF SAME PLACE.

NUT-LOCK.

SPECIFICATION forming part of Letters Patent No. 653,691, dated July 17, 1900.

Application filed March 1, 1900. Serial No. 6,999. (No model.)

*To all whom it may concern:*

Be it known that I, OLOF A. NORLUND, a resident of Cedar Run, in the county of Lycoming and State of Pennsylvania, have invented certain new and useful Improvements in Nut-Locks; and I do hereby declare the following to be a full, clear, and exact description of the invention, such as will enable others skilled in the art to which it appertains to make and use the same.

My invention relates to an improvement in nut-locks, one object of the invention being to provide an improved lock which will securely hold the nut against accidental turning, but which will permit, without liability of breaking, the removal of the nut when desired.

A further object is to provide a lock with improved means for securing it against movement when the nut is screwed home.

With these objects in view the invention consists in certain novel features of construction and combinations and arrangements of parts, as will be more fully hereinafter described, and pointed out in the claims.

In the accompanying drawings, Figure 1 is a view illustrating my improvements. Fig. 2 is a side view of the same. Figs. 3, 4, and 5 are detail views of the lock.

A represents a bar or plate, B a bolt passing therethrough, and C a nut screwed on the end of the bolt B.

My improved lock D comprises a strip or rod of spring metal, preferably angular in cross-section and of uniform thickness throughout its length. One end of the strip or rod is bent into circular form, as shown at 2, to surround the bolt B, one end of said circular portion being sprung outward, so as to engage the nut when screwed home. The strip or rod 1 after forming the circular portion 2 is given a quarter-twist to form a sharp cutting edge 3, which is forced into the bar A when the nut is screwed down, so that there will be no possibility of movement of the lock. The top of the rod is preferably flattened or made smooth to prevent injuring the nut, and the strip or rod extends in practically a straight line, as shown at 4, and at the end of the straight portion 4 the strip or rod is bent into an approximate semicircle, as shown at 5, and extends in a straight line beside the portion 4, as shown at 6, thus forming a long spring-loop, and is bent at 7 toward the circular portion 2 and outward in a different plane from said circular portion to form a spring-arm 8.

The operation of my improvements is as follows: The bolt B is first placed in position through the bars or plates to be secured, and the circular portion 2 of the lock D is placed around the protruding threaded end of the bolt. The nut is screwed onto the bolt, and as said nut is screwed home its corners will engage the outer face of the spring-arm 8 and force the same inward until the corner releases the arm and the latter springs outward. The nut will at the same time force the cutting edge 3 into the bar or plate A, and when the nut is screwed home the side of the spring-arm 8 will be flat against the nut and in the path thereof, thus absolutely preventing any accidental turning of the nut. When it is desired to remove the nut, it is simply necessary to place the proper tool thereon and turn it, and as the nut turns the spring-arm 8 will be forced outward or to one side by the sides of the nut until the latter is out of the path of the arm.

My improved lock can be employed on the angular head of a bolt, as well as a nut, and it will be seen that with my improved lock any dirt or refuse which may collect beneath the spring-arm 8 will not interfere in the slightest with the operation of said arm when the nut is being removed. This collection of dirt under the locks now in use is a great annoyance and trouble, and my lock will effectually remedy this difficulty, and owing to the outwardly-sprung end of the circular portion 2 the cutting edge 3 will be maintained in close contact with the bar A as long as there is any spring in the lock.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. A nut-lock, comprising a strip or rod bent at one end to partially surround a bolt, one end of said looped portion provided on its under face with a cutting edge and bent to form a spring-arm normally out of the plane of said looped portion and in the path of a nut.

2. A nut-lock, comprising a strip of spring metal angular in cross-section and bent at one end into circular form, one end of said circular portion having a quarter-twist to form a cutting inner edge, and bent to form a spring-loop having its free end projecting beyond the circular portion to engage the side of a nut or head of a bolt, said loop being constructed to permit its free member to be sprung outwardly by the nut or head of the bolt when unscrewed.

3. A nut-lock consisting of a strip of spring metal bent into circular form at one end and having its remaining portion bent to form an elongated loop having a flat outer face and an inner cutting edge, the free end of said elongated loop bent outwardly out of the plane of the circular portion so as to be engaged by a nut or head of a bolt passing through said circular portion.

In testimony whereof I have signed this specification in the presence of two subscribing witnesses.

OLOF A. NORLUND.

Witnesses:
O. B. COOLIDGE,
JOHN HILBORN.